March 24, 1942.  M. RUDERT ET AL  2,277,255
GUIDE BLADE BRAKE
Filed May 19, 1938  4 Sheets-Sheet 1

Inventors
MAX RUDERT,
LUDWIG MEISSNER
RUDOLF UNGETHUM
Attorneys

March 24, 1942.  M. RUDERT ET AL  2,277,255
GUIDE BLADE BRAKE
Filed May 19, 1938  4 Sheets-Sheet 2

Max Rudert
Ludwig Meissner
Rudolf Ungethum
Inventors.
Taulmin & Taulmin
Attorneys.

March 24, 1942.    M. RUDERT ET AL    2,277,255
GUIDE BLADE BRAKE
Filed May 19, 1938    4 Sheets-Sheet 3
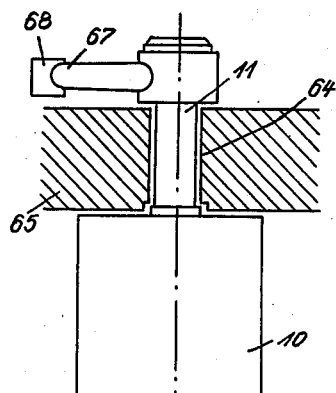
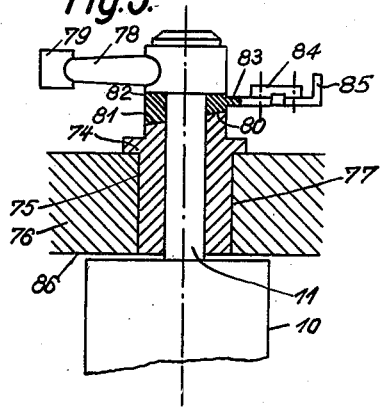
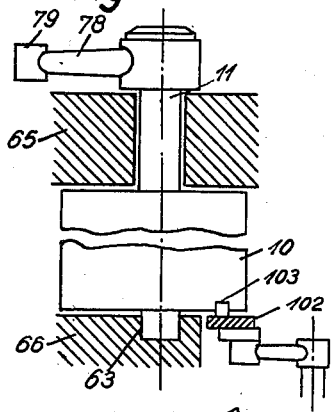
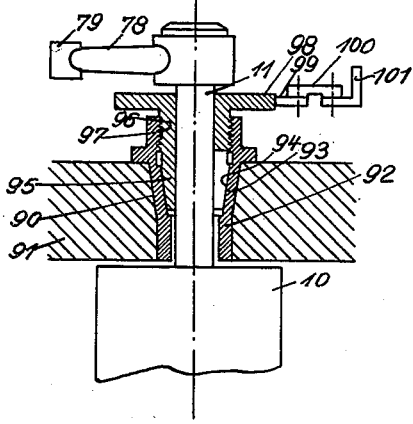
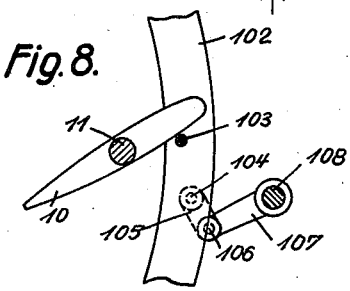
Max Rudert
Ludwig Meissner
Rudolf Ungethum
Inventors
Taulmin & Taulmin
Attorneys.

March 24, 1942.                M. RUDERT ET AL                2,277,255
                                GUIDE BLADE BRAKE
                              Filed May 19, 1938          4 Sheets-Sheet 4
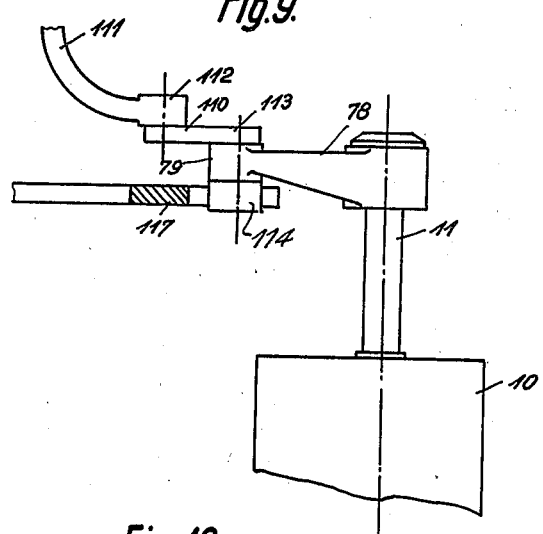
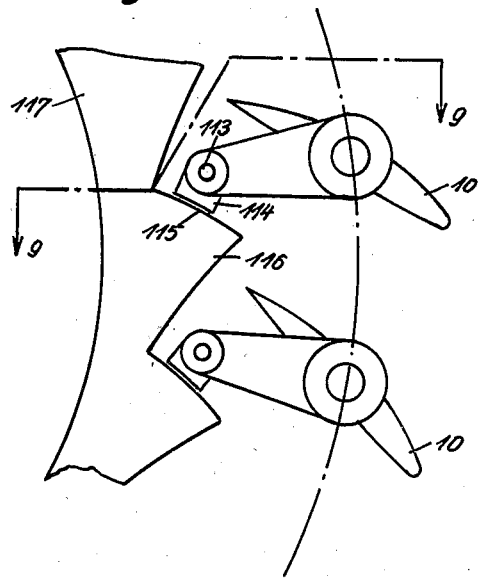
Max Rudert
Ludwig Meissner
Rudolf Ungethum
                Inventors.
Taulmin & Taulmin
                Attorneys.

Patented Mar. 24, 1942

2,277,255

UNITED STATES PATENT OFFICE 2,277,255

GUIDE BLADE BRAKE

Max Rudert, Ludwig Meissner, and Rudolf Ungethüm, Heidenheim, Brenz, Germany, assignors to J. M. Voith, Heidenheim on the Brenz, Germany, a copartnership composed of Walther Voith, Hermann Voith, and Hanns Voith Application May 19, 1938, Serial No. 208,908
In Germany May 24, 1937

6 Claims. (Cl. 253—122)

This invention relates to rotary machines, such as turbines or pumps, and in particular, to devices for preventing fluttering of the guide blades of such turbines.

One object of this invention is to provide an apparatus for the preventing of fluttering of the guide blades of rotary machines, particularly hydraulic pumps and water turbines, in such a manner as to hold the guide blade stationary during operation and thereby to insure quiet and safe operation of the machine.

Another object is to provide an apparatus for preventing the fluttering of rotary machines of this type, wherein a fluid pressure motor is arranged to actuate the guide blade brake.

Another object is to provide an apparatus of this character, wherein a braking effect is applied either directly to the spindle of the guide blade or to the operating lever thereof.

Another object is to provide an apparatus of this character, wherein a fluid pressure motor is arranged to operate the braking device, and is provided with control means of such a character that the operating pressure fluid is removed from the motor during the operation of adjusting the guide blades, thereby interrelating the adjusting device with the braking device.

Another object is to provide an apparatus of this character, wherein a fluid pressure motor operates brake shoes engaging the guide blade spindles, through a mechanism consisting of oppositely acting links and levers, or through the intermediate action of a movable member having cam surfaces thereon, or connected to the brake levers by a connecting rod.

Another object is to provide an apparatus of the above character, wherein a braking bushing surrounds the guide blade spindle and is operated by suitable mechanism to become constricted and therefore to engage the spindle with a braking grip.

Another object of the invention is to provide an apparatus of the above character, wherein a brake is directly applied to one end of the guide blade spindle or to a member interconnecting the various guide blades, for example, a ring.

In the drawings:

Figure 4 is a further modification showing a longitudinal section along the guide blade spindle of a hydraulic pump or turbine, showing a brake operated directly against the end of the guide blade spindle.

Figure 5 is an enlarged fragmentary view similar to Figure 4, showing a further modification of the braking mechanism.

Figure 6 is a view similar to Figure 5, but showing a further modification, wherein a braking bushing is applied to the guide blade spindle.

Figure 7 is a view similar to Figure 4, but showing a further modification, wherein the braking mechanism is applied through a member, such as a ring having portions engaging the various guide blades.

Figure 8 is a bottom plan view, partly in section, of Figure 7, with a portion of the housing removed to disclose the guide blade.

Figure 9 is a further modification showing a section along the line 9—9 in Figure 10, wherein the braking effect is applied to the guide blade operating levers through the ring having portions engaging shoes upon the guide blade operating levers.

Figure 10 is a plan view of the braking mechanism shown in Figure 9.

In general, the invention resides in a braking apparatus for preventing the fluttering of the guide blades of rotary machines, such as pumps and water turbines, and has for its purpose the holding fast of the guide blades during operation in order to insure a quiet and safe operation of the machine. Hitherto in such machines the guide blades have been mounted upon spindles so that their positions may be adjusted to regulate the flow of the fluid into the machine. In many installations, however, these guide blades would start fluttering by reason of the action of the fluid flowing past the guide blades, especially when this flow was undirected prior to its arriving at the guide blades. The oscillations set up in the guide blades were transmitted through the guide blade adjusting mechanism to the regulating mechanism, and these oscillations can create such a powerful effect that the efficiency and safe operation of the machine is endangered. The mere holding fast of the guide blades through the ordinary regulating mechanism does not usually suffice for this purpose. The applicants have found that the guide blades must be held fast by a special apparatus in the immediate vicinity of the guide blades.

According to the present invention, the braking mechanism for preventing this guide blade fluttering and for holding the guide blades fast operates either directly upon the guide blades upon their spindles, or upon the operating levers of these spindles. In one form of the invention the braking mechanism consists of brake shoes which are pressed against the guide blade spindles, either against the ends thereof or against the sides of the spindle, preferably by means of a fluid pressure motor, so that the guide blades are held fast in any desired working position. In one form of the invention the mechanical advantage of the force applied to the guide blades by the fluid pressure motor is increased by means of suitable mechanism, and by such mechanism two or more guide blades can be braked and held fast simultaneously by the same motor. Other forms of the invention employ cam surfaces or connecting rods for actuating the braking mechanism from a movable ring, which itself is actuated by a fluid pressure motor. Still other forms of the invention employ braking devices applying a braking effect directly to the guide blade spindle itself, or applying holding members directly to the guide blades or to the levers which adjust the positions of the guide blades.

Figure 1:
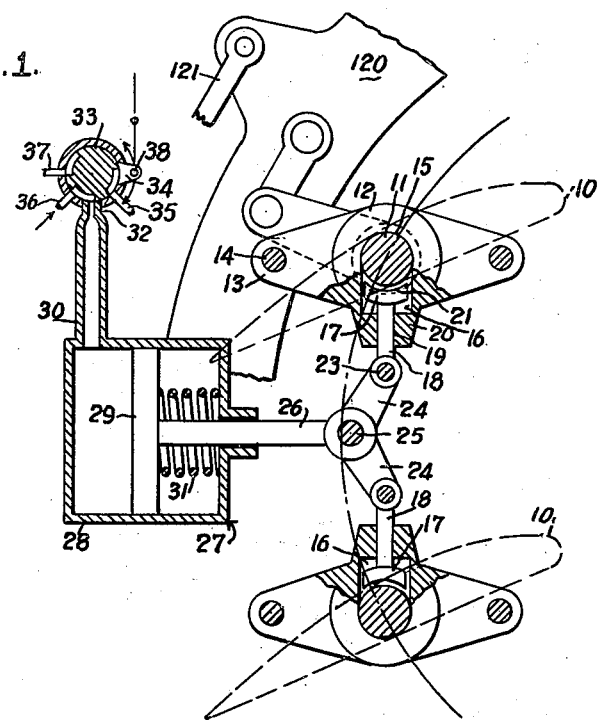
Figure 1 is a diagrammatic view, partly in section, showing a guide blade braking apparatus, wherein two brake shoes are applied simultaneously to the spindles of a pair of guide blades by means of a toggle lever mechanism operated by a fluid pressure motor.

Referring to the drawings in detail, Figure 1 shows a portion of a hydraulic turbine, wherein the guide blades 10 are mounted upon guide blade spindles 11, journalled in pedestal bearings 12 having bases 13 secured, as at 14, to the casing of the machine. Each pedestal bearing 12 is provided with a bore 15 for rotatably receiving the guide blade spindle 11, and also with a transverse chamber 16 containing a brake shoe 17 upon a rod 18, slidably mounted in the bore 19 within the extension 20 in the pedestal bearing 12. The brake shoe 17 is provided with a curved braking surface 21 which engages the guide blade spindle 11 for the purpose of holding it fast, and preventing its motion or fluttering in any position of its adjustment. The guide blade spindles 11 are arranged in an annular assembly in the usual manner along the circular path indicated by the circular arc 22, and are adjusted by suitable crank arms and an adjusting ring, which are omitted for the sake of more clearly showing the other mechanism. Such crank arm constructions for adjusting the guide blade positions are shown in Figures 4 to 10.

The brake rods 18 are pivoted by the pivot pins 23 to the ends of links 24, each pair of such links having a common pivot pin 25 forming an operating connection with the piston rod 26 of the fluid pressure motor, generally designated 27. The latter may consist of a cylinder 28 containing a reciprocatory piston 29, mounted upon the piston rod 26 and having a port 30 for the admission of pressure fluid for operating the piston 29 and piston rod 26. Suitable means such as the springs 31 may be provided for retracting the piston 29. The port 30 is connected by the conduit 32 to a brake valve 33 having a lever 34 operatively connected to the adjusting ring 120 for the guide blades 10.

In the operation of the apparatus shown in Figure 1, during the adjustment of the guide blades 10 the pressure is released from the cylinder 28 through the discharge conduit 35, at the same time that the pressure line 36 from the source of operating fluid is by-passed through the conduit 37. The brake valve lever 34 may be operated through suitable mechanism operatively connecting its pivot 38 with the control ring 120 for adjusting the guide blades 10. The control ring 120 is shifted by the rod 121 connected thereto. When the guide blades 10 are adjusted by the turning of their spindles 11, through the agency of the adjusting ring 120, the piston 29 and piston rod 26 are retracted to remove the brake shoes 17 from engagement with the guide blade spindles 11.

Figure 2:
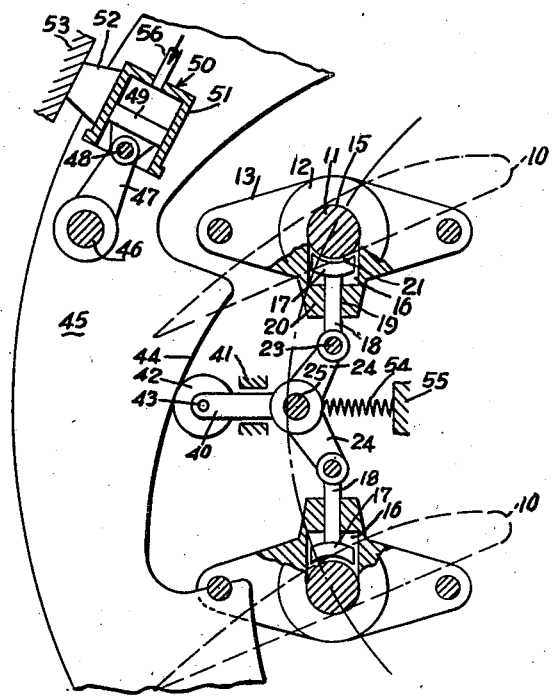
Figure 2 is a view similar to Figure 1, but showing a modification of the braking apparatus, wherein the braking mechanism is operated by a cam surface upon a movable member, such as a ring, which is shifted by a fluid pressure motor.

In the modification shown in Figure 2, the arrangement of the braking mechanism in the vicinity of the guide blade spindles is substantially the same as that in Figure 1 and similar reference numerals are employed. Instead of the piston rod 26, however, an operating rod 40 is slidably journalled, as at 41, and on its outer end carries a roller 42 mounted upon the pin 43 and engaging the cam surface 44 upon a movable member 45, here shown in the form of a ring. The ring 45 is actuated by means of a spindle 46, mounted thereon and pivotally engaged by the connecting rod 47, which is pivoted as at 48 to the piston 49 of a fluid pressure motor 50, having a cylinder 51 mounted upon a bracket 52 secured to the casing 53 of the machine. The braking mechanism of Figure 2 may be retracted in any suitable manner, such as by the spring 54 urging the roller 42 into engagement with the cam surface 44 at one end and abutting the stationary casing portion 55 at its opposite end.

In the operation of the braking apparatus shown in Figure 2, when it is desired to hold the guide blade spindles in any particular adjusted position, pressure is supplied to the piston 49 of the fluid pressure motor 50 through the pressure intake conduit 56. The piston 49 then moves tangentially and shifts the ring 45 and the cam surface 44 in such a manner as to move the rollers 42 and rods 40 inwardly, thereby forcing the brake shoes 17 against the guide blade spindles 11. The ring 45 may be retracted in any suitable manner, such as by springs, or by fluid pressure in a manner analogous to that shown in Figure 1. Similarly, the application of pressure to the motor 50 may be interrelated with the control ring for adjusting the guide blades 10, in a manner like that shown in Figure 1, wherein the pressure is removed from the motor 50 when the guide blades 10 are being adjusted. The construction shown in Figure 2 has the advantage that all of the respective braking mechanisms for the guide blade spindles 11 may be operated from a single fluid pressure motor 50.

Figure 3:
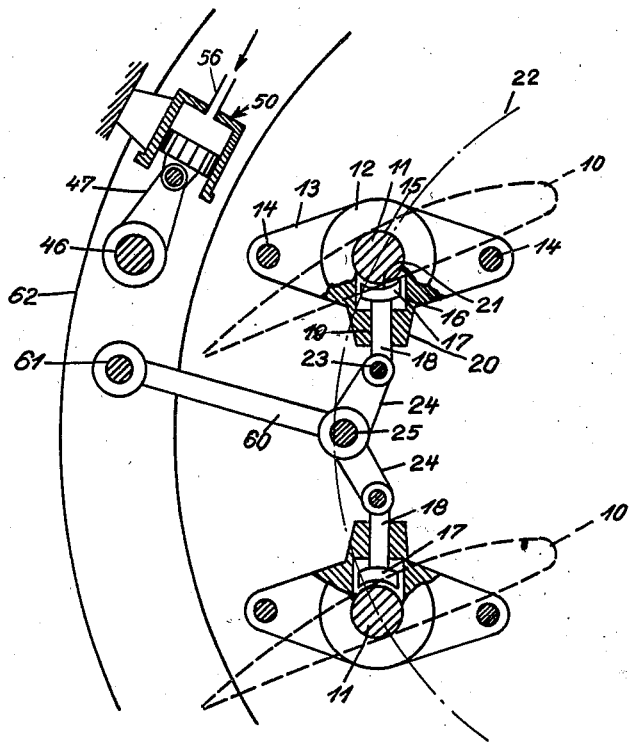
Figure 3 is a view similar to Figure 2, but showing a modification, wherein the braking mechanism is operated through a connecting rod or link from a movable member, such as a ring, the latter being shifted by a fluid pressure motor.

In the modified construction shown in Figure 3, the braking mechanism adjacent the guide blade spindles 11 is also similar to that of Figures 1 and 2, except that a connecting rod 60 is pivotally attached to the links 24 at the pivot shaft 25, and at its other end is pivotally connected to the spindle 61, mounted upon the ring 62. The latter is shifted by a fluid pressure motor mechanism 50, identical with that shown in Figure 2, and bearing similar reference numerals.

In the operation of the modification shown in Figure 3, the ring 62 is shifted by the fluid pressure motor 50 in the same manner as the ring 45 in Figure 2, and the same mechanism may be employed as in Figure 1 for retracting the ring 62 and for relating the admission of pressure in the motor 50 to the operation of the adjusting ring for the guide blades 10, in such a manner as to prevent the application of the brake shoes 17 during the adjustment of the guide blades 10. When the guide blades have been adjusted to a suitable position, the braking effect is applied by admitting pressure fluid to the motor 50 through the conduit 56. This shifts the ring 62 and the pivot pin 61, carried thereby, thus causing the connecting rod 60 to be shifted to the right in Figure 3, and forcing the brake shoes 17 against the guide blade spindles 11.

In the modification shown in Figure 4, the guide blade spindles 11 of the guide blades 10 are journalled, as at 63 and 64, in the casing portions 65 and 66 of the machine. Mounted upon one end of the guide blade spindle 11 is the guide blade operating lever or arm 67, to the outer end 68 of which connection is made to the adjusting ring for adjusting the positions of the guide blades 10. The opposite end 69 of each guide blade spindle 11 is engaged by a brake surface 70 mounted upon and actuated by the piston 71, reciprocable in the cylinder 72 within the casing 66. In the operation of the modification shown in Figure 4, pressure is admitted to the cylinder 72 through the conduit 73, forcing the piston 71 and the brake surface 70 into engagement with the end 69 of the guide blade spindle 11, holding the latter in its adjusted position. In Figure 4 the casing portion, designated 65, may consist of a pedestal bearing.

In the modification shown in Figure 5, the guide blade spindles 11 of the guide blades 10 are surrounded by bushings 74, mounted in bores 75 within the pedestal bearing 76. The spindle 11 passes through the bore 77 therein, and at its outer end is mounted the operating arm 78. This is connected at its outer end 79 to the adjusting ring in a manner similar to that described in connection with Figure 4. The bushing 74 is provided with an oblique surface 80 at its outer end, engaged by the corresponding oblique surface 81 upon the collar 82 surrounding the guide blade spindle 11. Attached to the collar 82 is an arm 83, operatively connected by the link 84 to a brake-operating ring 85. In operation, when the latter is shifted in any suitable way, the arm 83 is swung through an arc, thereby turning the collar 82 upon each guide blade spindle 11. This action causes the oblique surfaces 81 and 80 to engage each other with a cam-like action, in such a manner as to raise the guide blade spindles 11 and guide blades 10 so that the latter engage the surfaces 86 of the pedestal bearings 76.

In the modification shown in Figure 6, the construction of the guide blade 10, spindle 11 and operating arm 78 is similar to that shown in Figure 5. Surrounding the spindle 11 and mounted in a bore 90 in the pedestal bearing or casing portion 91 is a sleeve 92 having an internal conical portion 93. The latter is engaged by the corresponding conical portion 94 of a split bushing 95 having a threaded portion 96 engaging the correspondingly threaded portion 97 of the sleeve 92. The upper end of the split bushing 95 is provided with a flanged portion 98, carrying an arm 99 operatively connected, as at 100, to the brake-operating ring 101. In operation, when the brake-operating ring 101 is shifted, the arm 99 swings the conical split bushing 95 through an arc, screwing it inwardly and causing it to constrict the guide blade spindle 11, locking the latter in position.

In the modification shown in Figures 7 and 8, the construction of the guide blade 10 with its spindle 11 and operating arm 78, is also similar to that shown in Figure 5 and is similarly journalled, as in Figure 4. Arranged adjacent the respective guide blades 10, however, is a movable anchor ring 102, carrying projecting pins 103, which are caused to engage the guide blades 10 when the ring 102 is shifted. Mounted on the ring 102 is a pivot pin 104, pivotally connected to a link 105 which in turn is pivotally connected, as at 106, to a crank arm 107 mounted upon the shaft 108. In operation, when the shaft 108 is rotated in a clockwise direction, the ring 102 is shifted upwardly in Figure 8 and the pins 103 are caused to engage and hold the guide blades 10 in their adjusted positions, thereby directly preventing fluttering.

In the modification shown in Figures 9 and 10, the guide blades 10, spindles 11 and operating arms 78 are mounted in a manner similar to the corresponding structure in Figure 4, this structure being omitted for the sake of clearness of showing. Secured to the outer end 79 of the operating arm 78 is the adjusting ring 110, whereby the arms 78 of a plurality of guide blade spindles 11 may be simultaneously shifted. The ring 110 is, in turn, shifted by the member 111 pivotally connected thereto, as at 112, whereas the ring 110 is pivotally connected, as at the pin 113, to each of the outer ends 79 of the operating arms 78. Pivotally mounted upon the pins 113 are shoes 114 engaging the thrust surfaces 115 of the saw-tooth projections 116 of a brake-operating ring 117.

In the operation of the construction shown in Figures 9 and 10, the guide blades 10 are adjusted to any desired position by means of the member 111 and adjusting ring 110, whereupon the ring 117 is shifted by any suitable means, thereby bringing the thrust surfaces 115 of the projections 116 into engagement with the shoes 114. In this manner the guide blades 10 are prevented from rotating by means directly applied to the outer ends 79 of their operating arms 78. No fluttering of the guide blades 10 can therefore occur since they are held fixedly in position in the above described manner.

All of the foregoing constructions have the common purpose of preventing the guide blades from fluttering, either through braking or holding the guide blade directly, as in Figures 7 and 8, or indirectly braking the guide blade spindle, as in Figures 1 to 6, inclusive, or in holding fast the operating arms of the guide blade spindles, as in Figures 9 and 10. Whatever the mechanism chosen for this purpose, the result is achieved of preventing the fluttering of the guide blades and thereby insuring a quiet and safe operation of the mechanism.

It will be understood that we desire to comprehend within our invention such modifications as come within the scope of the claims and the invention.

Having thus fully described our invention, what we claim as new and desire to secure by Letters Patent is:

1. In a hydraulic machine having adjustable guide blades, means for adjusting the positions of said guide blades, rotatable spindles for supporting said guide blades, brake shoes engaging said spindles, and means for urging said brake shoes into engagement with said spindles.

2. In a hydraulic machine having adjustable guide blades, means for adjusting the positions of said guide blades, rotatable spindles for supporting said guide blades, brake shoes engaging said spindles, and means for simultaneously urging a pair of said brake shoes into engagement with a pair of said spindles.

3. In a hydraulic machine having adjustable guide blades, means for adjusting the positions of said guide blades, rotatable spindles for supporting said guide blades, brake shoes engaging said spindles, and means for urging said brake shoes into engagement with said spindles, said urging means comprising a fluid pressure motor.

4. In a hydraulic machine having adjustable guide blades, means for adjusting the positions of said guide blades, rotatable spindles for supporting said guide blades, brake shoes engaging said spindles, means for urging said brake shoes into engagement with said spindles, said urging means comprising a fluid pressure motor, and means for rendering said motor inoperative in response to the operation of said adjusting means.

5. In a hydraulic machine having adjustable guide blades, means for adjusting the positions of said guide blades, rotatable spindles for supporting said guide blades, brake shoes engaging said spindles, and means for urging said brake shoes into engagement with said spindles, said urging means comprising a fluid pressure motor having a piston rod operatively connected to said brake shoes.

6. In a hydraulic machine having adjustable guide blades, means for adjusting the positions of said guide blades, rotatable spindles for supporting said guide blades, brake shoes engaging said spindles, cam means for urging said brake shoes into engagement with said spindles, and means for operating said cam means.

MAX RUDERT.
LUDWIG MEISSNER.
RUDOLF UNGETHÜM.